(12) United States Patent
Bauer et al.

(10) Patent No.: US 6,430,285 B1
(45) Date of Patent: Aug. 6, 2002

(54) METHOD AND APPARATUS FOR AN AUTOMATED CALLER INTERACTION SYSTEM

(75) Inventors: Thomas M. Bauer, Belle Mead; Cory Gimourginas, Ocean; Gary A. Munson, Little Silver, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/210,685

(22) Filed: Dec. 15, 1998

(51) Int. Cl.$^7$ ................................................ H04M 3/00
(52) U.S. Cl. .................... 379/265.01; 379/223
(58) Field of Search .............................. 379/258, 265, 379/266, 210, 211, 212, 223, 93.12

(56) References Cited

U.S. PATENT DOCUMENTS

| | | | | |
|---|---|---|---|---|
| 4,656,624 A | * | 4/1987 | Collins et al. | 370/524 X |
| 4,726,056 A | * | 2/1988 | An et al. | 379/114 |
| 5,097,528 A | * | 3/1992 | Gursahaney et al. | 379/88.21 |
| 5,164,981 A | * | 11/1992 | Mitchell et al. | 379/88.01 |
| 5,392,402 A | * | 2/1995 | Robrock, II | 709/227 |
| 5,487,107 A | * | 1/1996 | Atkins et al. | 379/144 |
| 5,590,181 A | * | 12/1996 | Hogan et al. | 379/114 |
| 5,854,837 A | * | 12/1998 | Trader et al. | 379/265 |
| 5,987,118 A | * | 11/1999 | Dickerman et al. | 379/265 |
| 6,188,761 B1 | * | 2/2001 | Dickerman et al. | 379/265 |
| 6,327,363 B1 | * | 12/2001 | Henderson et al. | 379/93.03 X |

* cited by examiner

Primary Examiner—Creighton Smith
(74) Attorney, Agent, or Firm—Oliff & Berridge, PLC

(57) ABSTRACT

The invention provides an automated caller interaction system that interacts with an operator service system via both a telephone network and a data network. When a call is received, the service provider device interacts with the caller to receive information until the service provider determines that operator assistance is required. When an operator is required, the service provider device generates an operator request and sends the request to an operator service system through the telephone network. The operator service system identifies an available operator and the available operator is connected via a voice connection to the calling party through a bridge provided by the service provider device. The operator interacts with the caller, obtains any needed information, and provides such information to the service provider device via the data network. The operator disengages with the caller when the operator assistance is no longer needed and the service provider device resumes control of the interaction with the caller and completes the call.

20 Claims, 5 Drawing Sheets

| | 410 | 412 | 414 | 416 |
|---|---|---|---|---|
| 402 — AT&T OPERATOR SERVICE | OP@att.com | OPERATORS 1-35 | 134-145 | ... |
| 404 — GARY'S MAIL ORDER | Order@gary.com | OPERATORS 27-50 | 785-899 | ... |
| 406 — CORY'S COSMETICS | Cosm@cory.com | OPERATORS 8-20 | 237-746 | ... |

| 460 | 462 | 464 | |
|---|---|---|---|
| 472 — 1 | COLLECT CALL | DESTINATION NUMBER | ... |
| 454 — 2 | BILLING ACCOUNT | ACCOUNT NUMBER | ... |

METHOD AND APPARATUS FOR AN AUTOMATED CALLER INTERACTION SYSTEM

BACKGROUND OF THE INVENTION

1. Field of Invention

This invention relates to a method and apparatus for providing an automated caller interaction system.

2. Description of Related Art

Automated caller interaction systems are commonly used as an alternative to human operators or agents. Functions performed by traditional telephone operators, for example, may be performed by the automated caller interaction systems for caller assistance such as providing telephone numbers or for connecting a caller to a desired called party. Mail order houses may also use the automated caller interaction systems to take orders and provide order information. However, many times the automated caller interaction systems are unable to complete the caller interaction due to limitations to voice recognition technology, for example. Thus, new technology is needed to provide operator backup to automated caller interaction systems.

SUMMARY OF THE INVENTION

The invention provides an automated caller interaction system that interacts with an operator service system via both a telephone network and a data network. The service provider device may be operated by various businesses such as telephone service providers to provide operator services, mail order houses for receiving telephone orders, etc. When a call is received, the service provider device interacts with the caller to receive information until the service provider determines that operator assistance is required. Such a condition may occur when either the service provider device is unable to understand the caller's speech or ambiguities occur in the interaction that cannot be automatically resolved, for example. When an operator is required, the service provider device generates an operator request and sends the request to an operator service system through the telephone network via an interoffice common channel signaling (SS7), for example.

The operator service system identifies an available operator and the available operator is connected via a voice connection to the calling party through a bridge provided by the service provider device. The operator interacts with the caller to resolve any problems, obtain needed information, and then provide such information to the service provider device via the data network. When the operator disengages with the caller, the service provider device resumes control of the interaction with the caller and completes the call.

Multiple service provider devices may use one or more operator systems and operator systems may serve more than one service provider devices. In this way, new service provider devices may be constructed taking advantage of advanced technology without being required to incorporate operator services.

BRIEF DESCRIPTION OF THE DRAWINGS

The invention is described in detail with reference to the following figures wherein like numerals reference like elements, and wherein:

FIGS. 3 and 4 show exemplary diagrams of data that may be stored in a database of the operator service system;

DETAILED DESCRIPTION OF PREFERRED EMBODIMENTS

Figure 1:
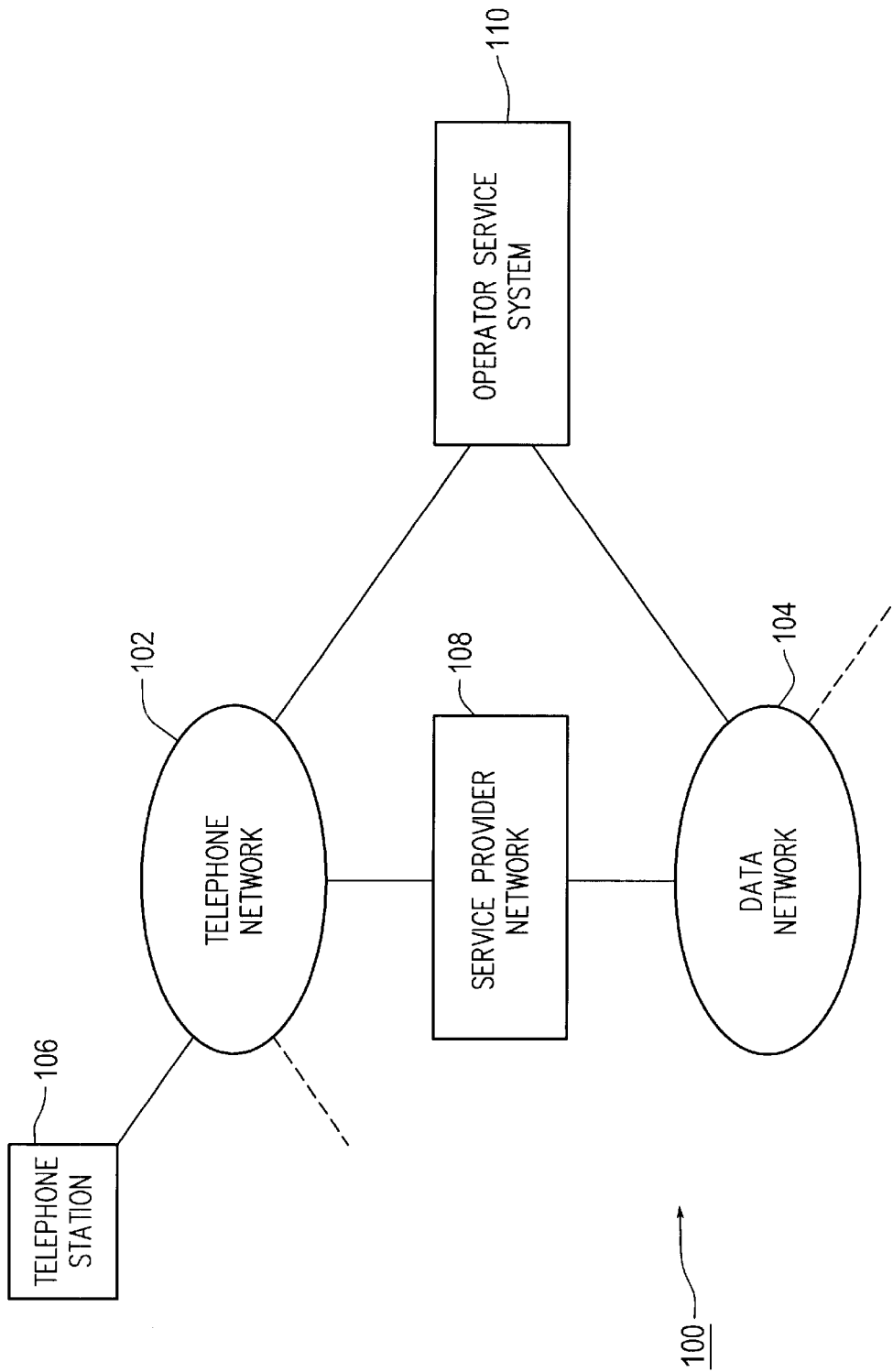
FIG. 1 shows a diagram of an automated caller interaction system.

FIG. 1 shows a diagram of an automated caller interaction system 100 that includes a telephone network 102, a data network 104, a service provider device 108 and an operator system 110. The service provider device 108 may be operated by many different types of businesses. For example, the service provider device 108 may be an automated operator service associated with the telephone network 102. A caller using a telephone station 106, for example, may call the service provider device 108 for directory assistance or to place a collect call, for example.

The service provider device 108 may also be operated by a mail order house or a small business where orders may be received or customer service may be provided. For example, if the service provider device 108 is operated by a mail order house, a caller using the telephone station 106 may call the service provider device 108 to place an order based on information obtained from a catalogue. The service provider device 108 may receive the order by obtaining information from the caller such as name, address, catalogue number, credit card number, etc. When all the information is obtained from the caller, the service provider device 108 may complete the call providing an estimated delivery date to the caller.

The operator service system 110 may include a pool of operators to serve as backup to the service provider device 108. For example, if due to unforeseen circumstances, the service provider device 108 is unable to continue interacting with the caller, the service provider device 108 may request for an operator to intervene by sending a request through the telephone network 102 to the operator service system 110. The operator may also be an automated system such as a more sophisticated caller interaction system that includes artificial intelligence, for example, that may handle a greater set of circumstances. The operator may resolve any problems by interacting with the caller, obtain any needed information and return the caller to the service provider device 108.

The automated caller interaction system 100 shown in FIG. 1 permits incorporating new technology into service provider devices 108 without also providing for integration of operators. Thus, the operator service systems 110 and the service provider device 108 may progress along different technology development paths without affecting each other. In this way, service provider devices 108 may be advanced technologically without consideration for operators while operator services may still be obtained via readily available standard interfaces such as the interoffice common channel signaling (SS7).

Figure 2:
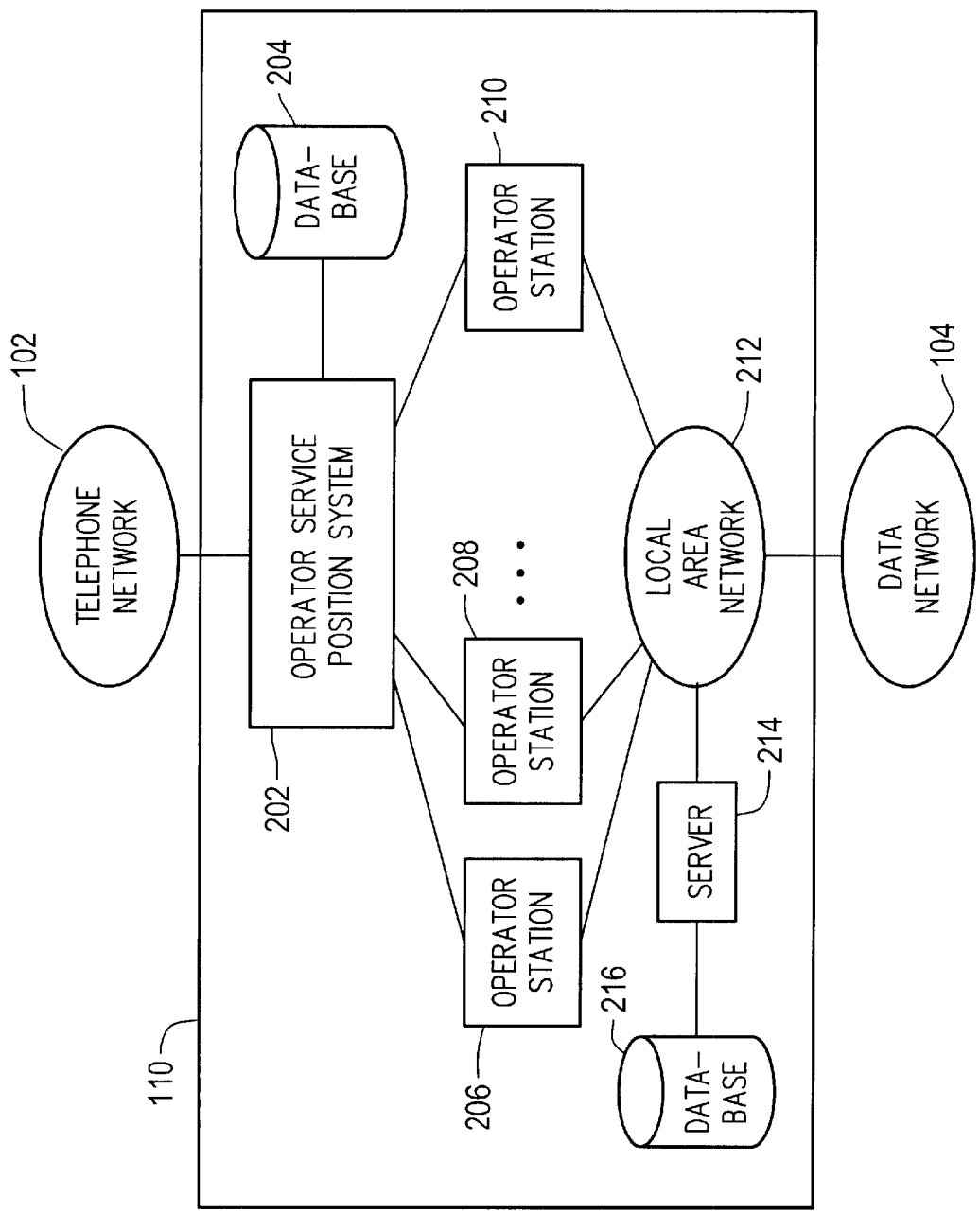
FIG. 2 shows a detailed diagram of an operator service system shown in FIG. 1.

FIG. 2 shows an exemplary diagram of the operator service system 110 which includes an operator service position system 202 coupled to a database 204 and a plurality of operator stations 206, 208 and 210. The operator service position system 202 may be a private branch exchange with automatic call distribution capabilities, for example. The operator station 206–210 may be coupled together via a local area network 212 which may provide access to a server 214 with a database 216 and the data network 104.

When the service provider device 108 determines that operator assistance is required, the request for operator services is sent to the operator service position system 202 through the telephone network 102 via the inter-office common channel signaling (SS7), for example. The request includes information that identifies the particular service provider device 108 and identifying information relating to a particular interaction with the caller, for example. A code may be included that identifies information to be obtained from the caller for which operator assistance is required. Based on the information provided by the service provider device 108, the operator service position system 202 identifies an available operator and then retrieves information from the database 204 that corresponds to the information (e.g., the code) provided by the service provider device 108. The information retrieved from the database 204 is downloaded to the operator station 206–210 associated with the operators and may be displayed on a display for the operator to be briefed or "primed" prior to interacting with the caller.

The operator may be further primed by information stored in the database 216 that is coupled to the server 214. For example, the operator service position system 202 may retrieve information from the database 204 that only indicates which programs or data should be retrieved from the database 216 for execution or display by the operator station 206–210. Such programs or data may provide various display formats to assist the operator in obtaining the information from the calling party. In addition, the server 214 may store the latest information related to the service provider device 108 in the database 216. For example, if the service provider device 108 is operated by a mail order house, the database 216 may be updated periodically to include all the items offered by the mail order house and any special prices that may be in effect relating to current advertisements. Thus, when the operator interacts with the calling party, the latest information may be provided to the operator based on the data contained in the database 216. The database 216 may be coupled to the data network 104 instead of the local area network 212 and either the server 214 or the operator station 206–210 may access the database 216 via the data network 104.

When the operator is ready to interact with the caller (as determined either by a signal sent by the operator through the operator station 206–210 to the operator service position system 202 or after a predetermined amount of time, for example), the operator service position system 202 connects the operator station 206–210 through the telephone network 102 to the service provider device 108. The service provider 108 bridges the operator station 206–210 to the telephone station 106, for example. In this way, the operator may freely converse with the calling party to resolve any problems and/or obtain needed information from the caller. The service provider device 108 may remain on the line to resume the interaction with the calling party when the operator has completed the required assistance.

During the interaction between the operator and the caller, information is collected by the operator and entered into the operator station 206–210 and forwarded to the service provider device 108 through the local area network 212 and the data network 104. The operator also sends to the service provider device 108 the identifying information that associates the information transferred over the data network 104 with the particular caller so that the service provider device 108 can process the information accordingly. The service provider device 108 receives and verifies the information. If the information received from the operator station 206–210 is invalid, the service provider device 108 may send a message to the operator through the data network 104. For example, if a calling card number obtained by the operator was determined by the service provider device 108 to be invalid, the service provider device 108 may send a message to the operator for confirmation of whether the number was incorrectly entered by the operator or whether the calling party incorrectly provided the calling card number. In addition, the service provider device 108 may also provide further instruction and/or data to the operator for continued interaction with the caller. Thus, the service provider device 108 may indirectly interact with the calling party through the operator so that the needed information may be obtained.

While FIG. 2 shows that the operation stations 206–210 are coupled together via the local area network 212, such an architecture is only exemplary. For example, each of the operation stations 206–210 may include an interface card that directly interfaces with the data network 104, such as well known in the art. In addition, while FIG. 2 shows the operation stations 206–210 being under a single operator service position 202, operators may be distributed throughout the country geographically and multiple operator service position systems 202 may provide the necessary services.

Also, while FIG. 1 shows only one service provider device 108, many such service provider devices 108 may be included and many operator service systems 110 may also be included. One operator service system 110 may provide operator assistance to many service provider devices 108 and each service provider device 108 may take advantage of operators at many operator service systems 110.

FIGS. 3 and 4 show exemplary diagrams of the contents of the database 204. FIG. 3 shows a data block 400 that includes entries 402, 404 and 406 corresponding to multiple service provider devices 108. For example, entry 402 corresponds to an AT&T operator service, entry 404 corresponds to Gary's mail order business and entry to 406 corresponds to Corey's cosmetic business. Each of the entries may include multiple fields. For example, field 410 may indicate a specific service provider device 108; field 412 may indicate the data network address of the service provider device 108 so that the operators may communicate with the appropriate service provider device 108; field 414 may indicate which of the operators in the operator service system 110 may provide the services requested by each of the businesses corresponding to the entries 402–406. For example, operators 1–35 may have been explicitly trained to provide operator services for AT&T while operators 27–50 may have been trained to be familiar with Gary's mail order products and operators 8–20 may have been trained to respond to calls relating to Corey's cosmetics. Thus, the field 414 provides an ability for operators to specialize.

Field 416 may indicate an account number to which operator services may be billed. For example, when one of the operators 1–35 provides operator services for AT&T, the account number 134–145 is billed for those services. Similarly, services rendered for Gary's mail order house are billed to 785–899 and services provided for Corey's cosmetics are billed to 237–746, for example.

FIG. 4 shows a data block 450 having entries 452–454 that correspond to different information that the operator is to obtain from the calling party. One data block 450 corresponds to each of the entries 402–406 in data block 400. Each of the entries 452–454 includes fields 460, 462 and 464. The field 460 may indicate a code that may be provided by the service provider device 108, for example, to select the specific information indicated in the field 464 that is needed from the calling party; and the field 462 may indicate the subject matter of the call. Other information may also be included for each entry 402–406 that may assist in the information acquisition process.

The service provider device 108, the operator service position system 202 and the operator/operator station 206–210 may function together to interact with the caller as shown in the table below. In row 1, the service provider device 108 receives the call from the caller. The service provider device 108 interacts with the caller until it is determined that an operator is needed to further the interaction, as shown in row 2. At this point, the service provider device 108 requests an operator from the operator service system 110 by sending an operator request to the operator service system 110 through the telephone network 102 via the interoffice common channel signaling (SS7), for example.

device 108 receives the information obtained by the operator via the data network 104 and may verify whether the information is correct. Interactions between the service provider device 108 and the operator may occur to ensure that valid information is received from the calling party. In row 7, the operator disengages from the caller and the service provider device 108 resumes control of the interaction with the caller. The service provider device 108 continues interacting with the caller until the transactions with the caller is completed as shown in row 8. After completion of the transaction, the service provider device 108 terminates the call and proceeds to process the transaction based on specific requirements of the associated businesses.

Figure 5:
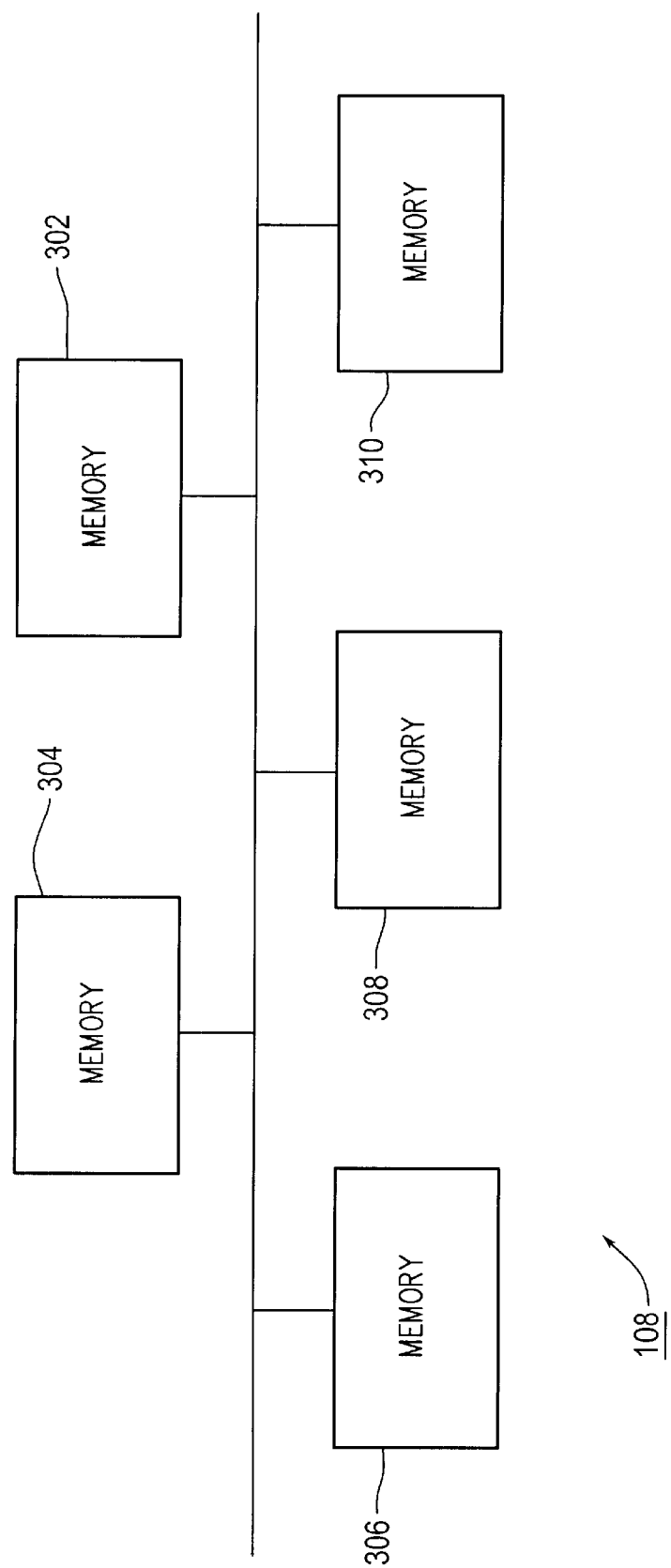
FIG. 5 shows a block diagram of a service provider device of FIG. 1.

FIG. 5 shows a block diagram of the service provider device 108 which includes a controller 302, a memory 304, a telephone network interface 306, a data network interface 308 and a database interface 310. The above components are

|   | Caller | Service Provider Device | Operator Service Position System | Operator/Operator Station |
|---|---|---|---|---|
| 1 | Calls the Service Provider Device | Receives call | | |
| 2 | | Determines that Operator needed | | |
| 3 | | Requests operator from Operator Service System | Receives Service Provider Device's request | |
| 4 | | | Identifies Operator; connects operator to Service Provider Device; and provides Operator with information to prepare for call | Reviews information received from the Operator Service Position System |
| 5 | Interacts with the Operator | Bridges Caller with Operator while remaining on line | | Engages with caller and receives additional information from caller |
| 6 | | Receives the additional information from the Operator via the data network | | Transfers the additional information to the Service Provider Device via the data network |
| 7 | Interacts with Service Provider Device | Resumes control of interaction with caller | | Disengages with caller |
| 8 | Completes call and goes on-hook | Completes call and terminates | | |

The operator service system 110 receives the service provider device's requests as shown in row 3 and then proceeds to retrieve information from the database 204 such as shown in FIG. 3 to identify an operator that may provide the requested services. When an available operator is identified based on information in the data block 400, appropriate information is downloaded to the operator station 206–210 associated with the operator so that the operator may review the information and be primed for interacting with the calling party. The operator station 206–210 may also retrieve information from the database 216 through the server 214 to prime the operator.

As shown in row 5, the operator interacts with the caller via voice through the telephone network 102 and a bridge provided by the service provider device 108. When the needed information is acquired, the operator enters the information in the corresponding operator station 206–210 and the information is sent to the service provider device 108 via the data network 104. In row 6, the service provider coupled together via a signal bus 312. The bus architecture shown in FIG. 5 is exemplary only. Other architectures are possible as is well known in the art. For example, all the components may be directly connected to the controller 302 via I/O ports of the controller 302.

When a caller calls the service provider device 108, the controller 302 receives the call through the telephone network interface 306 and proceeds to interact with the caller. While this discussion assumes that the controller 302 interacts with the caller directly, the controller 302 may also interact with a switch/peripheral device of the telephone network sending instructions to the switch/peripheral device to interact with (e.g., play a message) the caller, connecting the caller to the operator service system 110, or bridging the caller and the operator, for example. The telephone network interface 306 may include advance devices such as voice recognition and speech synthesis so that interaction with the calling party via voice may be accomplished. However, if the voice recognition device (or the switch/peripheral device) cannot recognize the speech spoken by the calling party, or if the controller 302 is unable to continue the process due to ambiguities in the answers provided by the calling party, for example, the controller 302 generates an operator request and sends the request through the telephone network interface 306 to the operator service system 110. The telephone network interface 306 may send such information through SS7 signaling, for example. The controller 302 may either wait for a predetermined amount of time or wait until a signal is received from the operator service system 110 before bridging the operator through the operator service system 110 with the calling party via the telephone network interface 306.

After the operator is bridged by the telephone network interface 306 with the calling party, the controller 302 waits for information to be received through the data network interface 308. When such information is received, the controller 302 stores the information either in the memory 304 or on a database via the database interface 310. The controller 302 verifies the information by confirming calling card account numbers, account balances, etc. either via the database interface 310 or through communications with other systems via the data network interface 308 or the telephone network interface 306.

After all the information is obtained that requires operator assistance, the controller 302 resumes control of the interaction with the calling party by disconnecting the operator and directly interacting with the calling party through the telephone network interface 306. The controller 302 continues interacting with the calling party until the transactions with the calling party is completed. At this point, the controller 302 terminates the call with the calling party and proceeds to process the information obtained from the caller as required.

Figure 6:
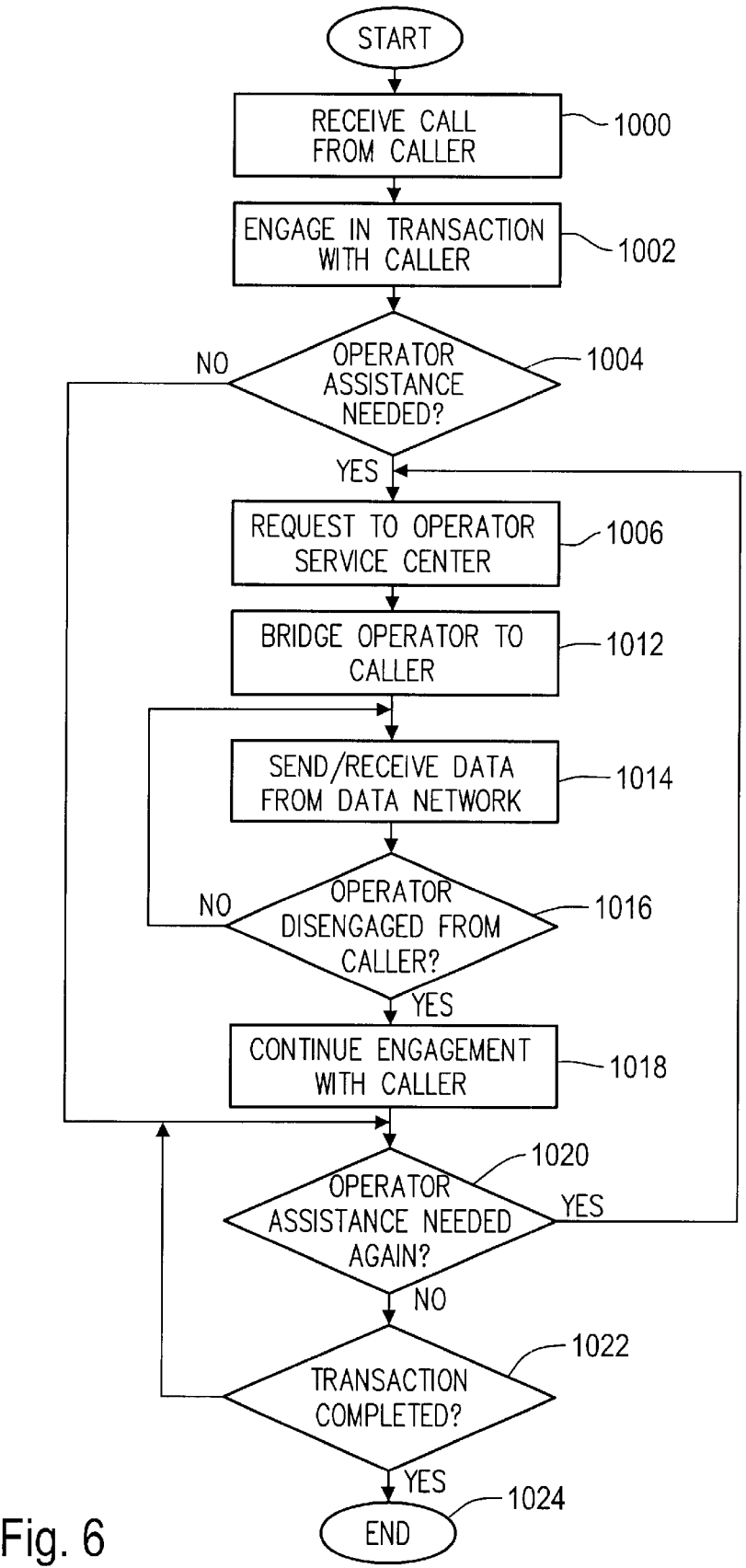
FIG. 6 shows a flowchart of a process of the automated provider device.

FIG. 6 shows a flowchart of a process of the service provider device 108. In step 1000, the controller 302 receives the call from the caller and goes to step 1002. In step 1002, the controller 302 engages with the caller to receive information from the caller regarding the transaction and goes to step 1004. In step 1004, the controller 302 determines whether operator assistance is needed. If operator assistance is not needed, the controller 302 goes to step 1018; otherwise, the controller goes to step 1006.

In step 1006, the controller 302 generates an operator request to the operator service system 110 to request the services of an operator and goes to step 1012. In step 1012, the controller 302 bridges the operator station 206–210 corresponding to the identified operator to the calling party and goes to step 1014. In step 1014, the controller 302 receives data via the data network 104 and interacts with the operator via the data network 104 to confirm that the received data is correct. For example, if the service provider device 108 is a mail order house and an item ordered by the calling party has been determined to be discontinued, the controller 302 may send a message to the operator to indicate that the desired item has been discontinued and to request the operator to inform the caller and to query whether other items are desired. Thus, the controller 302 and the operator interacts with each other through the data network 104 to obtain all the information required to complete the transaction with the caller.

After step 1014, the controller 302 goes to step 1016. In step 1016, the controller 302 determines whether the operator should be disengaged with the caller because the services of the operator are no longer needed. The operator may send a signal via the data network 104 or the telephone network 102 to the controller 302 to request disengagement or the controller 302 may detect a predetermined period of "quiet" time, for example. If the operator is to be disengaged, the controller 302 goes to step 1018, otherwise, the controller 302 returns to step 1014.

In step 1018, the controller 302 continues engagement with the caller and goes to step 1020. In step 1020, the controller 302 determines whether operator assistance is needed again. If operator assistance is needed again, the controller 302 goes to step 1006; otherwise, the controller 302 goes to step 1022. In step 1022, the controller 302 determines whether the transaction with the calling party is completed. If completed, the controller 302 goes to step 1024 and ends the process; otherwise, the controller 302 returns to step 1018.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A method for a communication device to interact with a caller over a telephone network, comprising:
   transmitting an operator request via an interoffice common channel signaling system to an operator service system if it is determined that the caller requires assistance; and
   bridging an operator to interact with the caller over the telephone network.

2. The method of claim 1, wherein the operator request includes information that identifies:
   a source of the operator request; and
   an indication of data that needs to be obtained from the caller.

3. The method of claim 2, wherein the operator request further includes additional information that identifies one of data or programs to prime the operator.

4. The method of claim 2, wherein the operator service system identifies one of a plurality of operators as the operator and retrieves operator priming information from a database based on the operator request.

5. The method of claim 1, wherein the bridging step comprises:
   waiting either for a signal from the operator or for a predetermined amount of time; and
   connecting the operator to the caller after either the signal from the operator is received or the predetermined of time is expired.

6. The method of claim 1, further comprising:
   remaining connected to the caller while the operator is bridged to the caller; and
   resuming interaction with the caller when the operator disengages with the caller.

7. The method of claim 1, wherein the delivering step comprises:
   receiving the data from the operator via the data network;
   validating the data; and
   sending a message to the operator if the data is determined to be invalid, the message requesting the operator to verify correctness of the data.

8. The method of claim 7, further comprising sending instructions and/or data to the operator via the data network to further the interaction with the caller.

9. The method of claim 1, wherein the interaction with the caller is performed by instructing a switch or a peripheral device of the telephone network, and the bridging step is performed by the switch or the peripheral device of the telephone network system.

10. A method for providing operator backup to an automated caller interaction system, comprising:

providing the automated caller interaction system to interact with a caller;

transmitting an operator request via an interoffice common channel signaling system;

coupling the automated caller interaction system with an operator service system via a telephone network; and coupling the automated caller interaction system with a plurality of operators of the operator service system via a data network.

11. The method of claim 10, further comprising:

providing a database in the operator service system, the database including information corresponding to operator requests received from the automated caller interaction system; and providing operator stations associated with the operators, the operator stations receiving data from the database that corresponds to the operator requests.

12. The method of claim 11, further comprising:

coupling the operations over a local area network;

coupling the local area network with the data network, the operators communicating with the automated caller interaction system via the local area network and the data network and communicating with callers over the telephone network.

13. The method of claim 12, further comprising:

providing a server on the local area network; and providing a database for the server, the database containing information for priming the operators.

14. A device that interacts with a caller over a telephone network, comprising:

a telephone network interface;

a data network interface; and a controller coupled to the telephone network interface and the data network interface, the controller transmitting an operator request via an interoffice common channel signaling system to an operator service system if it is determined that operator assistance is required, and bridging an operator with the caller over the telephone network via the telephone network interface.

15. The device of claim 14, wherein the operator request includes information that identifies:

a source of the operator request; and an indication of data that needs to be obtained from the caller.

16. The device of claim 15, wherein the operator request further includes additional information that identifies one of data or programs to prime the operator.

17. The device of claim 15, wherein the operator service system identifies one of a plurality of operators as the operator and retrieves operator priming information from a database based on the operator request.

18. The device of claim 14, wherein the controller waits either for a signal from the operator or for a predetermined amount of time, and connects the operator to the caller after either the signal from the operator is received or the predetermined of time is expired.

19. The device of claim 14, wherein the controller remains connected to the caller while the operator is bridged to the caller, and resumes interaction with the caller when the operator disengages with the caller.

20. The device of claim 14, wherein the controller receives the data from the operator via the data network, validates the data, and sends a message to the operator if the data is determined to be invalid, the message requesting the operator to verify correctness of the data.

* * * * *